United States Patent
Royle

(10) Patent No.: US 6,178,988 B1
(45) Date of Patent: Jan. 30, 2001

(54) HYDRANT DESIGN

(75) Inventor: Stephen D. Royle, Stoughton, WI (US)

(73) Assignee: Baker Manufacturing, Evansville, WI (US)

(*) Notice: Under 35 U.S.C. 154(b), the term of this patent shall be extended for 0 days.

(21) Appl. No.: 09/209,869

(22) Filed: Dec. 11, 1998

(51) Int. Cl.[7] .............................. E03B 9/14; F16K 24/02; F16K 31/60
(52) U.S. Cl. ........................ 137/288; 137/292; 137/307; 251/231; 251/279; 251/344; 251/347; 251/349; 251/353; 251/900
(58) Field of Search .................................. 137/272, 274, 137/278, 279, 286, 287, 288, 291, 292, 302, 307; 251/90, 231, 279, 343, 344, 347, 349, 353

(56) References Cited

U.S. PATENT DOCUMENTS

| | | | |
|---|---|---|---|
| 164,864 | * 6/1875 | Murdock | 137/288 |
| 168,599 | * 10/1875 | Bailey | 137/288 |
| 227,193 | * 5/1880 | White | 137/302 |
| 330,776 | * 11/1885 | Dowling et al. | 137/288 |
| 341,403 | * 5/1886 | Burnett et al. | 137/287 |
| 351,924 | * 11/1886 | Keyes | 137/287 |
| 394,529 | * 12/1888 | White | 137/288 |
| 413,638 | * 10/1889 | White | 137/288 |
| 417,633 | * 12/1889 | Dowling | 137/288 |
| 455,782 | * 7/1891 | White | 137/287 |
| 2,730,326 | * 1/1956 | Staben | 137/302 |
| 3,070,116 | * 12/1962 | Noland et al. | 137/302 |
| 3,523,549 | * 8/1970 | Anderson | 137/288 |
| 3,672,392 | * 6/1972 | Anderson | 137/288 |
| 4,372,339 | * 2/1983 | Anderson | 137/288 |

* cited by examiner

Primary Examiner—George L. Walton
(74) Attorney, Agent, or Firm—Quarles & Brady, LLP

(57) ABSTRACT

A hydrant valve assembly including a spool member having at least one spool seal which is at times under extremely high pressure tending to cause the seal to be displaced from an associated recess, the spool member forming venting passages in the seal recess to alleviate seal pressure, the invention also including a new wet pipe design and a new collar design.

12 Claims, 3 Drawing Sheets

HYDRANT DESIGN

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to yard hydrants and more particularly to a hydrant including a spool design which reduces the possibility of a spool seal being displaced from the spool.

A yard hydrant is installed on water systems to provide a frost resistant source of water remote from a heated building. An exemplary hydrant includes a hydrant valve, a dry pipe, a wet pipe and an activation handle. The hydrant valve includes both a valve housing and a spool member positioned within the housing. The housing forms an inlet or supply port, a drain port, and an opening to accept the spool and seals. The spool member forms an inlet opening or passage, an outlet opening and a passageway between the inlet and outlet openings. The hydrant valve is buried below the frost line and a water supply line runs below the frost line to the supply port.

The dry pipe is secured to the housing below the frost line and extends up to a comfortable operating position above ground level. The wet pipe is positioned within the dry pipe and is secured and sealed at a lower end to the spool member so that the member outlet opening opens into the wet pipe channel. The handle is mounted to the top end of the dry pipe via a collar and is linked to the upper end of the wet pipe for forcing the wet pipe and spool member secured thereto between open and closed positions via a lever handle action. The upper end of the wet pipe is also linked to a hydrant outlet spigot.

Referring to FIG. 1, an exemplary collar 10 for mounting the handle (not illustrated) to a dry pipe 12 is typically generally cylindrical. To enable easy collar casting the cross section of a collar wall has a frusto-conical shape (i.e. is essentially cone shaped). The angled wall sides are required to allow necessary draft in a sand casting process. The collar 10 is mounted to the dry pipe 12 by sliding the collar 10 onto the top end of the dry pipe 12 and threading a locking set screw 14 through a threaded collar aperture 16 which is perpendicular to a central collar axis 18. The inner end 20 of the screw contacts an external surface 22 of the dry pipe 12 and clamps the pipe 12 between the inner end 20 and a point 26 on a facing portion 24 of the collar opposite the collar aperture 16. The handle is linked to the collar via a collar extension (not illustrated).

The hydrant valve is a 2-position, 3-way valve having closed and open positions. In the open position the spool member is positioned such that the inlet passage is closed to the drain port and is open to the housing inlet or supply port to supply water flow to the spool member outlet, the wet pipe and the hydrant outlet.

To turn off the hydrant, an operator causes the valve to assume the closed position by forcing the handle downward to force the wet pipe and spool member downward. In the closed position the spool member is positioned such that the inlet passage is closed to the supply port and is open to the drain port. This allows any water in the wet pipe to drain below the frost line, and prevents water from freezing within the hydrant in cold climates.

To provide watertight seals, the hydrant valve is equipped with elastic seals, typically elastomeric O-rings, which seal the inlet closed when the valve is in the closed position and seal the drain port closed when the valve is in the open position. To this end the housing includes an internal surface and the spool member includes an external surface. The external surface forms recesses for receiving the seals which seal between the internal and external surfaces and move along the internal surface as the valve is opened or closed.

To ensure that the valve is opened and closed as the activation handle is manipulated, the wet pipe is formed of a rigid metallic material which essentially does not bend under the force required to manipulate the valve even when the hydrant must be over 10 feet long.

Unfortunately, while the hydrant design described above does perform he basic functions required of a yard hydrant, the design does have several shortcomings. First, this hydrant design cannot be used with water systems which provide high supply pressure without the use of an expensive pressurereducing valve. Water system pressures have been climbing because high pressure is desirable for many reasons. For example, often high pressure is required to fight fires. In the industrial and agricultural industries, including irrigation, high pressure water systems are advantageous for rapidly supplying water. Often, water system pressure is not controlled by an end user but is rather controlled by a water utility. Water utilities are often required to supply high pressure water at lower elevations or geographically immediate locations to have any reasonable pressure available at high elevation or geographically remote locations. When a high pressure supply line is linked to a hydrant valve often the valve seals can be inadvertently forced from their recesses. For example, while a valve is opened the hydrant outlet may be blocked causing pressure to build within the wet pipe and valve. If the valve is closed prior to relieving the wet pipe pressure, the pressure in the wet pipe is placed on one of the seals during the closing process. This extreme pressure often causes the seal to become unseated.

While a seal may fortuitously find its way back into its recess, often the seal does not and the entire spool member has to be removed to reseat the seal. Typically the seal is lost in the drain. The reseating task is time consuming and in many cases is exacerbated in frigid weather.

Second, the metal wet pipe is relatively expensive and therefore objectionable as the pipe costs increase the overall costs of the yard hydrant.

Third, it should be appreciated from FIG. 1 that the collar 10 provides very little resistance to collar rotation generally and specifically about an axis from the inner end 20 to a contact point 26. This minimal resistance results in handle rocking and can affect the stroke length required to open and close the valve.

Therefore, it would be advantageous to have a new hydrant design which minimizes the possibility of unseated seals, which has a secure handle mounting collar, and which is relatively inexpensive.

BRIEF SUMMARY OF THE INVENTION

It has been recognized that venting passages can be provided in at least one of the spool member recesses to substantially reduce the likelihood of an unseated seal. Specifically, according to the present invention during valve movement from the open to the closed positions one seal is moved from a sealing position to an unsealed position (i.e.

the seal is spaced from the internal housing wall). The recess associated with this seal includes a land of recess surface behind the seal which is proximate (i.e. closest to) the drain port. According to the present invention, the spool member forms a venting passage behind the seal between the lower corner of the recess and a spool member external surface proximate the drain port. If pressure causes the seal to lift away from the land, this pressure is relieved through the venting passage and the drain port. Thus pressure in the recess behind the seal drops thereby reducing the force pushing the seal out of the recess. When the pressure subsides the seal drops back into the recess, water under pressure is free to flow around the seal and pressure no longer pushes the seal out of the recess.

With respect to the wet pipe, according to the present invention the wet pipe is designed to have an external surface having a width dimension which is less than, but similar to, the width dimension of an internal surface of the dry pipe. In this manner the wet pipe is guided by the dry pipe such that the wet pipe will not buckle or substantially bend under a typical activation force. Thus, the wet pipe can be formed of a rigid, yet still bendable, material such as PVC or the like. PVC is appreciably less expensive than metal pipe and therefore, by designing a wet pipe in this manner the overall hydrant costs can be reduced appreciably.

With respect to the collar two improvements have been made. First, the threaded collar aperture has been formed to be perpendicular to the internal surface of the collar opposite the aperture. In this manner, when the screw forces the dry pipe against the opposite collar surface, the surface and pipe contact along essentially the entire length of the collar.

Second, instead of being cylindrical, the shape of the collar inner surface is revised to provide a relief in the inner diameter which is large enough that the inner diameter contacts the outer diameter of the pipe along two lines of contact. In this way, the collar inner surface contacts the dry pipe along two lines of contact, a significant distance apart and along the full collar length. The set screw still contacts the dry pipe at a single point positioned roughly half way between the contact lines. The resistance to turning is increased substantially using the same economical manufacturing processes, and without applying any higher assembly loads to the dry pipe.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION

Figure 1:
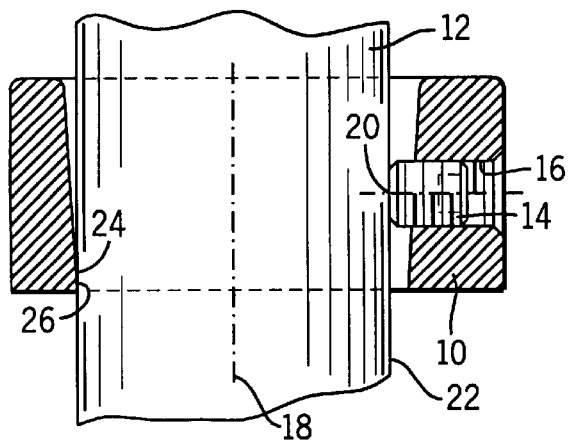
FIG. 1 is a is a cross sectional view of a prior collar design.

Referring now to the drawings wherein like reference characters represent corresponding elements throughout the several views and, more specifically, referring to FIG. 2, the present invention will be described in the context of an exemplary yard hydrant 30. Hydrant 30 generally includes a valve assembly 32, a pipe assembly 34 and a handle assembly 36.

Valve assembly 32 includes an elongated housing 38, a spool member 40 and first, second, third and fourth seals 44, 46, 42 and 92, respectively. Housing 38 forms an internal surface 48 which forms a chamber 49 about a housing axis 51. Internal surface 48 in turn forms first and second sealing surfaces 50, 52, respectively, a first expanded section 54 between sealing surfaces 50 and 52 and a second expanded section 56 adjacent a housing end wall 58.

Figure 4:
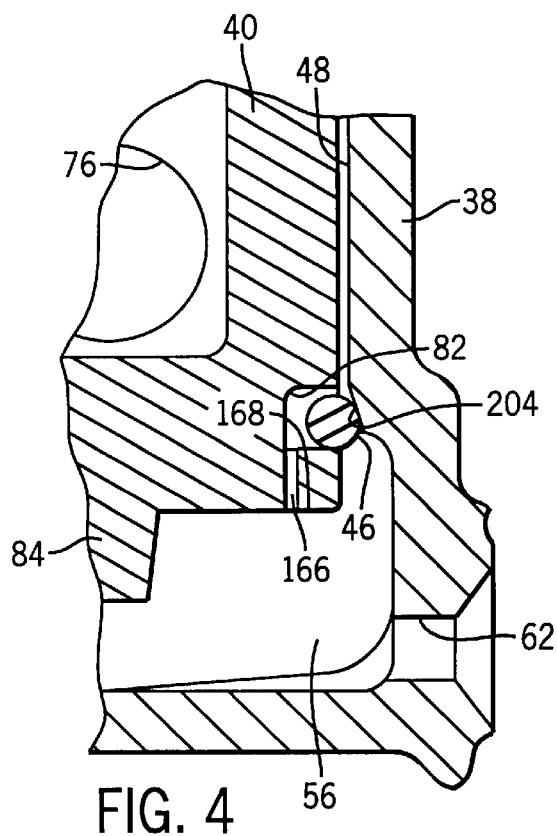
FIG. 4 is a cross sectional view of the portion of FIG. 2 identified by numeral 4.
Figure 2:
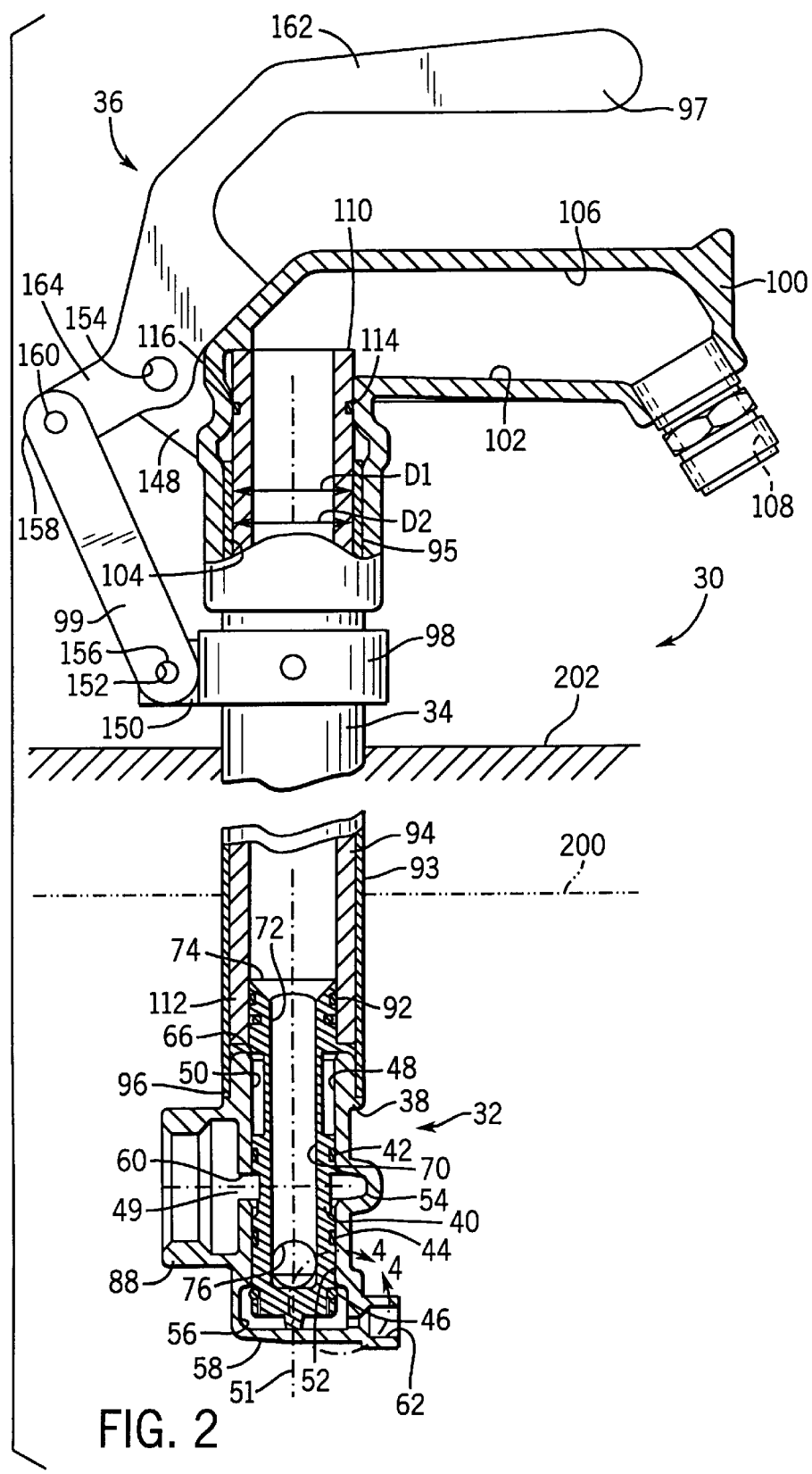
FIG. 2 is a partial cross sectional view of a yard hydrant according to the present invention.

Referring to FIGS. 2 and 4, at the points where the sealing surfaces 50, 52 merge into the expanded sections 54, 56, lead-in chamfers are provided to guide the seals 42, 44, 46 into and out of engagement with internal surface 48 without catching a sharp edge under pressure. As all chamfers are essentially identical, only one is shown in FIG. 4 as 204.

Referring still to FIG. 2, housing 38 also forms an inlet 60 into first expanded section 54 and forms a drain port adjacent end wall 58 which extends into second expanded section 56. Moreover, housing 38 also forms an opening 66 opposite end wall 58 which faces upwardly.

Figure 3:
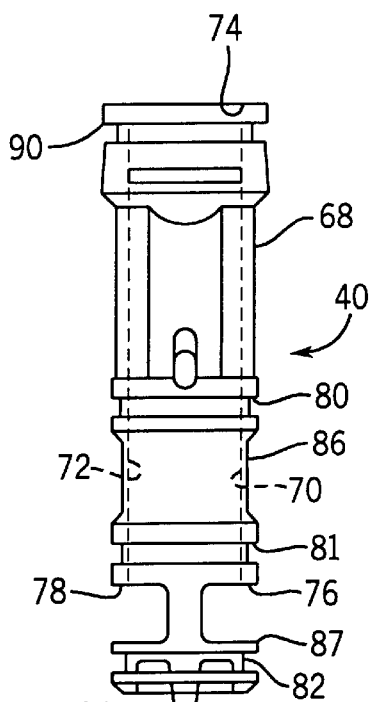
FIG. 3 is a side elevational view of the spool member of FIG. 2.

Referring now to FIGS. 2 and 3, spool member 40 is an elongated cylindrical member which forms an external surface 68 and an internal surface 70 which defines a passageway 72 from an outlet opening 74 at a top end to one or more inlet passages 76, 78 at an end opposite opening 74. Passages 76 and 78 open laterally through external surface 68.

External surface 68 also forms first, second, third and fourth recesses 81, 82, 80 and 90, respectively, which are annular and circumferential about surface 68. Surface 68 between recesses 80 and 81 is closed and is therefore referred to as a closed surface 86. Surface 68 between recesses 81 and 82 forms passages 78 and 76 and is therefore referred to as an open surface 87. In addition, surface 68 defines a diameter which is slightly less than internal surface 48 of housing 38. An axial extension 84 extends from the end of spool member 40 opposite opening 74.

Each seal 42, 44, 46 and 92 is preferably an elastomeric O-ring, although seals with a variety of cross sections are used, including rectangular section, lobed sections, cup-shaped sections, etc. Seals 42, 44 and 46 are received within recesses 80, 81 and 82, respectively and, when received therein, extend slightly radially therefrom so that, as seen in FIG. 2, when spool member 40 is positioned within housing 38, when a seal is within the area defined by either the first or second sealing surfaces 50, 52, respectively, the seal is compressed between external surface 68 and internal surface 48 providing a watertight seal thereat. Similarly, seal 92 is received within recess 90 such that when a lower end of a wet pipe (described below) is secured therearound, a watertight seal is formed between the external surface 68 of spool member 40 and the internal surface of the wet pipe.

A female port 88 for receiving a water supply line (not illustrated) is formed about inlet 60. It is contemplated that a pressurized water supply line is linked to female port 88.

Referring to FIGS. 2 and 4, one and preferably a plurality of venting passages 166 are formed between a back lower edge of recess 46 and a portion of external surface 68 adjacent drain port 62. Operation of passages 166 will be described below.

Referring still to FIG. 2, pipe assembly 34 generally includes a dry pipe 93 and a wet pipe 94. Dry pipe 93 has an internal diameter D1 which is slightly greater than the external diameter D2 of wet pipe 94. Dry pipe 93 is formed of a rigid relatively nonflexible material such as steel whereas wet pipe 94 is formed of a less expensive and more flexible, although relatively rigid, material such as PVC. Dry pipe 93 includes a top end 95 and a bottom end 96. Bottom end 96 is securely attached to the upper end of housing 38 and is aligned with axis 51. Attachment of bottom end 96 to housing 38 can be done in any manner well known in the art and therefore is not explained here in detail.

Wet pipe 94 has an upper end 110 and a lower end 112. Lower end 112 is secured around the upper end of spool 40 so that seal 92 is sealed against an internal surface of wet pipe 94 to form a watertight seal therewith. Upper end 110 forms a recess 114 for receiving a seal (e.g. another elastomeric O-ring) which forms a watertight seal between the external surface of wet pipe 94 and an internal surface of an outlet spigot described below.

Referring still to FIG. 2, housing assembly 36 includes a handle 97, a collar 98, a lever 99 and an outlet spigot 100. Spigot 100 defines an internal surface 102 which forms a cylindrical inlet 104, a flow channel 106 and a spigot or hydrant outlet 108.

Inlet 104 is sized and formed such that it securely receives upper dry pipe end 95. This constrains motion of the outlet spigot 100 to move up and down axis 51. Wet pipe end 110 is secured within inlet 104 in any manner well known in the art. Thus, wet pipe end 110 moves along axis 51 as handle assembly 36 is moved there along. To form a watertight seal between upper end 110 and flow channel 106, seal 116 seals between the internal surface of inlet 104 and the external surface of end 110. Top end 95 of dry pipe 93 terminates within inlet 104 also, but is not securely linked within inlet 104 (i.e., pipe 93 does not move with other handle assembly components). A handle mounting extension 148 extends from output spigot 100 opposite flow channel 106 and forms a mounting aperture 154.

Figure 5:
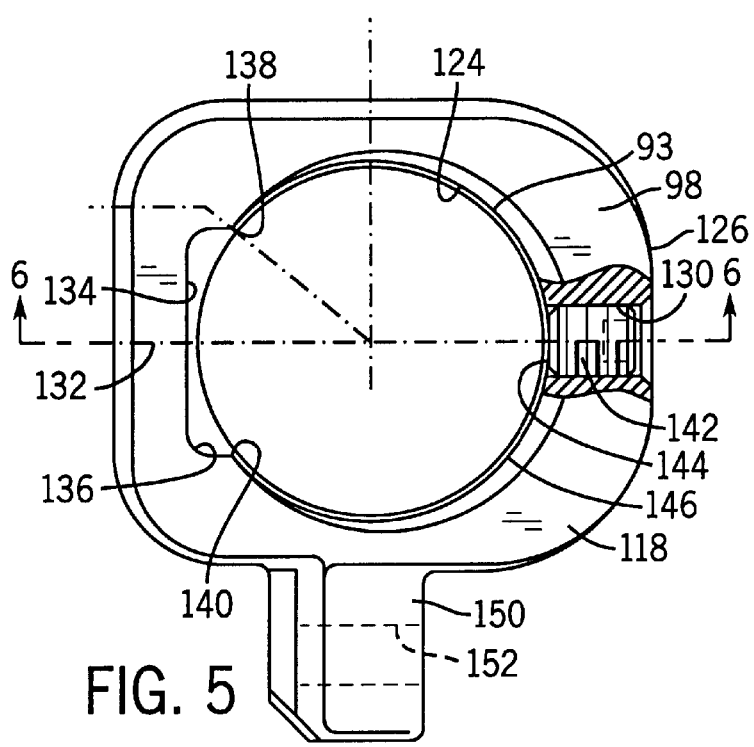
FIG. 5 is a top perspective view of the collar of FIG. 2.
Figure 6:
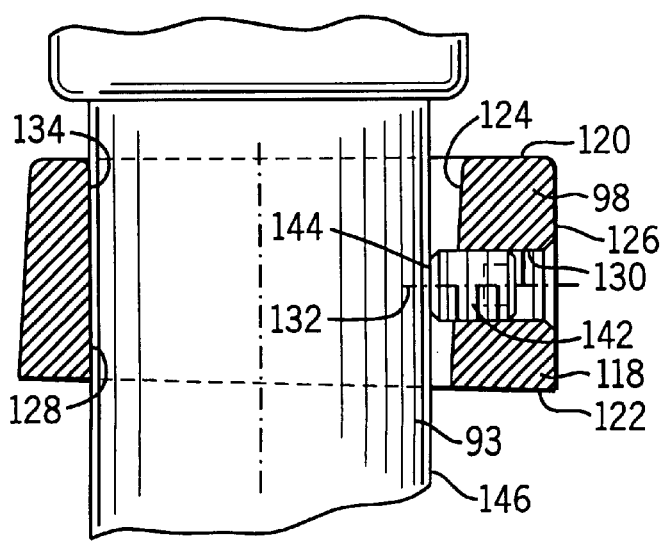
FIG. 6 is a cross sectional view taken along the line 6—6 of FIG. 4.

Referring now to FIGS. 2, 5 and 6, collar 98 includes a lateral wall 118 which traverses between first and second collar ends 120,122, respectively, forming oppositely facing internal and external surfaces 124, 126, respectively. Internal surface 124 forms a passageway for receiving dry pipe 93. As illustrated, at any section through wall 118, the cross section has a frusto-conical shape which is wider at second end 122 than at first end 120. This shape is required for casting purposes. A threaded collar aperture 130 extends between the internal and external surfaces 124, 126, respectively, along an aperture axis 132. Aperture 130 is formed such that axis 132 is perpendicular to an opposing section 134 of internal surface 124.

In addition, referring specifically to FIG. 5, opposing section 134 forms a relief 136 which forms two edges 138,140 which are perpendicular to axis 132. When pipe 93 is positioned within passageway 128, a locking set screw 142 is threadably received within aperture 130 such that a distal or inner end 144 of screw 142 contacts an external pipe surface 146 and forces an opposite side of the pipe against the two edges 138,140 along essentially the entire lengths of the edges 138 and 140. It should be appreciated that by providing aperture 130 perpendicular to opposing section 134, screw 142 can be used in conjunction with collar 98 with relief 136 to provide a relatively large amount of friction impeding collar 98 rotation about pipe 93 and other collar movement. Referring to FIGS. 2 and 5, a collar extension 150 extends radially from collar 98 perpendicular to axis 132 and forms an extension aperture 152.

Referring again to FIG. 2, lever 99 includes a first end 156 which is linked to collar 98 via a pin which passes through aperture 152 and a second end 158 which forms an aperture 160. Handle member 97 includes a handle extension 162 which is linked to handle mounting extension 148 by a pin which passes through aperture 154. Member 97 also includes a cam extension 164 which extends opposite handle extension 162 and is linked to the second end of lever 99 by a pin which passes through aperture 160.

Referring still to FIG. 2, when assembled spool member 40 is positioned within housing 38 with dry pipe 93 extending upwardly from housing 38 and wet pipe 94 extending upwardly from spool member 40 to handle assembly 36. The lower end 112 of wet pipe 94 forms a watertight seal about the upper end of spool member 48 while the inlet of spigot 100 forms a watertight seal about the upper end 110 of wet pipe 94. Thus, there is an unbroken flow path from passages 76 and 78, through passageway 70, wet pipe 94 and channel 106 to hydrant outlet 108. Collar 98 is secured about the external surface of pipe 93 with lever 99 extending upwardly from extension 150 to extension 164. Handle member 97 is linked to extension 148. When installed valve assembly 32 is positioned below a frost line 200 and handle assembly 36 is positioned a suitable/comfortable distance (i.e. 2–4 feet) above a ground level 202.

In operation, with handle extension 162 down (i.e., as illustrated in FIG. 2), wet pipe 94 and spool member 40 are in a closed position with second and third seals 44 and 42, respectively, sealed between external surface 68 and internal sealing surfaces 50 and 52, respectively. In this position, water at inlet 60 is blocked by closed surface 86 (see FIG. 3). In addition, referring to FIGS. 2 and 3, passages 76 and 78 are opened at least partially into second expanded section 56. Thus, any water within flow channel 106, wet pipe 94 or passage 70 is free to flow through passages 76 and 78 into expanded section 56 and thereafter out drain port 62.

To turn on the hydrant, an operator grasps handle extension 162 and pulls upwardly and backwardly. When extension 162 is so pulled, cam extension 164 and lever 99 align vertically forcing outlet spigot 100 upward. As spigot 100 is forced upward, because wet pipe 94 is securely attached thereto and spool member 40 is securely attached to lower end 112 of wet pipe 94, both wet pipe 94 and spool member 40 are forced upwardly. Cam extension 164 and lever 99 are sized such that when they align vertically, spool member 40 travels upward within housing 48 such that passages 76 and 78 are aligned with first expanded section 54 and therefore are aligned with inlet 60. When so aligned, first and second seals 44 and 46 form watertight seals between external surface 68 and sealing surfaces 50 and 52, respectively. As passages 76 and 78 are open to inlet 60, pressurized water at inlet 60 is forced through passageway 70, wet pipe 94 and flow channel 106 to outlet 108.

Now, assuming hydrant components are in the open position (i.e., passages 76 and 78 are aligned with inlet 60), it will also be assumed that outlet 108 is blocked for some reason, (i.e., a hose linked to outlet 108 is closed). In this case, pressure builds up within channel 106, wet pipe 94, passageway 70 and expanded section 54. Now, assuming handle extension 162 is forced into the closed position illustrated in FIG. 2 to close the hydrant, as the handle is pushed downward, second seal 46 slides along sealing surface 52 to a bottom edge thereof just above expanded section 56 (see also FIG. 4). In the prior art hydrant design, pressure built up in channel 106 and wet pipe 94 flows through the clearance between surface 48 and surface 68 on the spool and builds up in recess 82 behind seal 46 tending to force seal 46 out of recess 82 and down toward section 56, seal 46 many times becoming unseated and therefore resulting in an ineffective seal.

According to the present invention, venting passages 166 reduce pressure on seal 46 and therefore appreciably reduce the likelihood of seal 46 becoming unseated. In this manner, as the pressure within wet pipe 94 forces seal 46 slightly out of recess 82, a venting path between seal 46 and a back surface of recess 82 opens allowing the pressure to be released through venting passage 166 into expanded section 56 and then out drain port 62. Because there is minimal clearance between surface 48 on the body and surface 68 on the spool and this is the only route for water to reach the seal cavity, the pressure built up behind the seal drops quickly with a small flow through the vent. After the pressure has been released, seal 46 springs back into recess 82 and water within channel 106 and wet pipe 94 drains through passages 76 and 78 and around seal 46 to drain out of port 62.

It should be appreciated that the present invention serves three purposes. First, by providing the venting passage(s) seals which are under high pressure are not forced out of their respective recesses. Second, by providing a wet pipe which has an external diameter which is nearly identical to the internal diameter of the dry pipe, a relatively inexpensive material (i.e., PVC) can be used to form the wet pipe, the dry pipe 93 guiding the wet pipe 94 therein. Third, the inventive collar design reduces handle assembly rotation and helps to maintain a constant stroke for turning the hydrant on and off.

It should be understood that the methods and apparatuses described above are only exemplary and do not limit the scope of the invention, and that various modifications could be made by those skilled in the art that would fall under the scope of the invention.

To apprise the public of the scope of this invention, the following claims are made:

What is claimed is:

1. A spool apparatus for use with a hydrant, the hydrant including an elongated housing which forms an internal sealing surface about a chamber along an axis, the chamber including a first sealing section formed by a sealing surface and an enlarged section adjacent the sealing section, the sealing section and enlarged section having first and second width dimensions perpendicular to the axis, respectively, the second dimension greater than the first, the housing also forming a housing opening at one end and first and second openings in the sealing and enlarged sections, one of the openings being an inlet and the other being a drain, the apparatus comprising:

at least two annular seals;
   a spool member forming an external surface having first and second circumferential recesses which receive the seals, an open surface between the first and second recesses, respectively, the member also forming an internal passageway having an outlet end which opens into the housing opening, the member forming a passageway passage between the passageway and the open surface, when positioned in the chamber, the member moveable along the axis between at least:
   a first position wherein the first and second seals seal between the external and sealing surface on opposite sides of the first opening allowing passage from the passageway passage to the first opening; and
   a second position wherein the first seal seals between the external and sealing surfaces, the second seal within the enlarged section and the passageway passage at least partially open to the enlarged section and hence to the second opening;
   the member forming a venting passage from the second recess to a portion of the external surface on the side of the second recess opposite the first recess such that, when the member moves from the first to the second postion, pressure within said hydrant causes the second seal to move within said second recess such the venting passage in unblocked and the pressure within said hydrant is released into said enlarged section.

2. The apparatus of claim 1 wherein the chamber includes first and second sealing sections and first and second enlarged sections, a first enlarged section between the sealing sections and a second enlarged section on the side of the second sealing section opposite the first enlarged section, the apparatus further including a third annular seal, the spool member forming a third circumferential recess which receives the third seal, and also forming a closed surface between the third and first recesses, when the spool member is in the first position, the first seal sealing between the external and first sealing surfaces and a second seal sealing between the external and second sealing surfaces and, when in the second position, the third seal sealing between the external and first sealing surfaces, the first seal sealing between the external and second sealing surfaces and the second seal with the second enlarged section.

3. The apparatus of claim 2 wherein the third recess is the vented recess.

4. The apparatus of claim 2 wherein the third recess includes a venting surface proximate the drain and the venting passage is between the venting surface and the external surface.

5. The apparatus of claim 2 wherein the inlet is perpendicular to the axis, the outlet is aligned with the axis and the drain is perpendicular to the axis.

6. The apparatus of claim 5 wherein the housing has upper and lower ends, the drain is at the lower end and the housing includes an end wall adjacent the drain, the lower wall closing the lower end of the housing, the spool member including an axial extension which extends from a member end adjacent the end wall, the extension contacting the end wall and limiting member movement.

7. The apparatus of claim 2 wherein the spool member is linked to an extended valve activation member at a proximate end.

8. The apparatus of claim 2 wherein the member forms a plurality of venting passages.

9. The apparatus of claim 1 wherein the drain is vertically higher than the inlet.

10. An apparatus for use with a hydrant, the hydrant including a dry pipe, a valve spool and a valve housing, the pipe having top and bottom ends and an internal diameter D1, the housing linked to the lower end, the spool positioned for movement within the housing between open and closed positions, the apparatus comprising:

a wet pipe having upper and lower ends, the wet pipe positioned inside the dry pipe such that the upper end is adjacent the top end and the lower end is adjacent the bottom end, the lower end linked at the lower end to the valve spool, the wet pipe having an external diameter D2 which is slightly less than internal diameter D1 and formed of a rigid yet flexible material, the external diameter forming an external surface and the internal diameter forming an internal surface, the spool moveable between the open and closed positions by raising and lowering the upper end;
   whereby, when downward force is applied to the upper end, a portion of the external surface contacts a portion of the internal surface and the internal surface restricts bowing of the wet pipe so that the downward force is applied to the spool causing the spool to its open position.

11. The apparatus of claim 10 further including a handle attached to the upper end.

12. The apparatus of claim 10 wherein liquid passes through the wet pipe when the spool is in the open position.

* * * * *